G. FERGUSON.
RUBBER SOLE FOR TURN SHOES.
APPLICATION FILED JULY 30, 1917.
1,303,871.
Patented May 20, 1919.
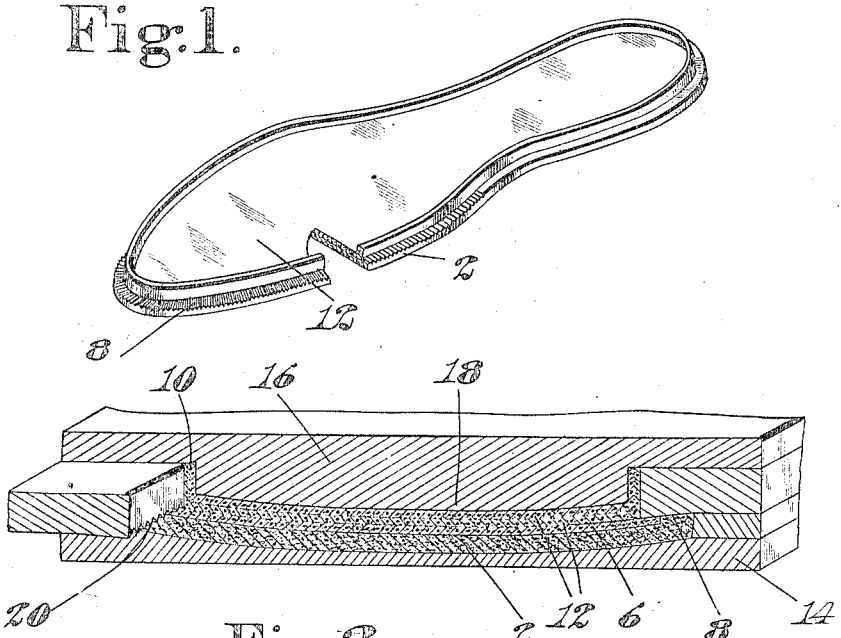
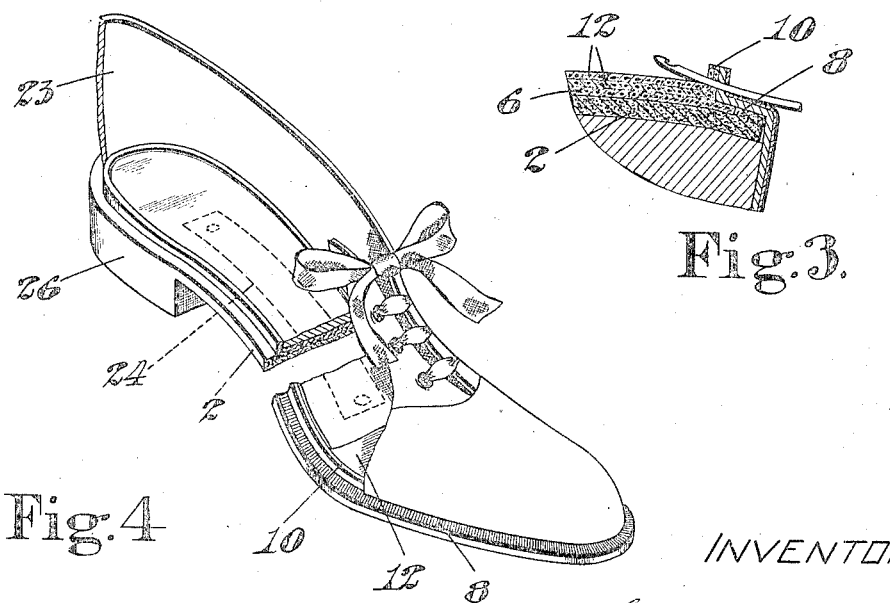
INVENTOR
George L Ferguson

UNITED STATES PATENT OFFICE.

GEORGE FERGUSON, OF WOLLASTON, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

RUBBER SOLE FOR TURN-SHOES.

1,303,871.   Specification of Letters Patent.   Patented May 20, 1919.

Application filed July 30, 1917. Serial No. 183,517.

*To all whom it may concern:*

Be it known that I, GEORGE FERGUSON, a citizen of the United States, residing at Wollaston, in the county of Norfolk and State of Massachusetts, have invented certain Improvements in Rubber Soles for Turn-Shoes, of which the following description, in connection with the accompanying drawings, is a specification, like reference characters on the drawings indicating like parts in the several figures.

The present invention relates to improvements in soles for use in the manufacture of boots and shoes and is more particularly applicable to soles which are used principally in the manufacture of turn shoes.

An object of the present invention is to provide an improved rubber sole which is applicable to the turn method of making shoes and which will enable a more serviceable and better appearing turn shoe to be produced than the rubber soles heretofore provided for this purpose. To this end and in accordance with an important feature of the invention the sole consists of rubber compound body having a layer of fibrous material overlying the upper side of the body and secured to the said rubber body by vulcanization with a free edge projecting above laterally adjacent portions of the rubber body and constituting a stitch receiving and holding element for the sole. In the illustrated embodiment of the invention the layer of fibrous material, the free edge of which constitutes the stitch receiving and holding element for the sole, comprises a plurality of laminæ of strongly woven fabric overlying the upper side of the rubber body from feather of the sole on one side to the feather on the opposite side but terminating in both sides at the inside line of the feather.

In accordance with a further feature of the invention the sole has a fibrous reinforce applied to the margin of the rubber body and preferably extending inwardly under the sewing rib which reinforcing layer, during the sewing operation, protects the rubber body from being penetrated during the passage of the needle through the sewing rib and thus weakening the sole and, during the wear of the shoe, assists in maintaining the shape of the feather of the sole. This reinforcing layer preferably does not extend entirely across the sole terminating for example a short distance within the outer edge of the sole. As thus arranged the reinforcing serves to prevent distortion of the sole when it is incorporated in a shoe and materially strengthens the feather of the sole. It has been found that better results are secured by employing a reinforcing layer consisting of coarsely woven rubberized canvas because this material becomes more firmly bonded to the rubber body by vulcanization and insures a stronger attachment of the rib forming layer of material to the reinforcing layer. As herein illustrated, the reinforcing layer of material and the sewing rib forming material taken together constitute a laminated structure extending partly across the sole and terminating within the edge of the rubber body where it lies on the feather of the sole. This composite sole structure may be produced at a much lower cost than a rubber compound sole having a greater proportion of rubber without sacrificing wearing qualities and also reducing the weight of the sole.

Other objects and features of the invention will be apparent from the following description considered in connection with the accompanying drawings and the invention will be defined in the claims.

In the drawings,

Figure 1 is a perspective of a preferred embodiment of the sole of the present invention;

Fig. 2 illustrates in perspective a section of the mold in which the sole is made;

Fig. 3 is an enlarged cross section of a portion of the sole illustrating the manner of securing the upper to the sole;

Fig. 4 is a perspective view, partly in section, of the completed shoe embodying the present invention.

In the illustrated preferred embodiment of the invention, the sole comprises a body portion 2 of rubber compound of a suitable thickness at its forepart portion to afford sufficient wear and shaped roughly to the shape of a sole blank. This rubber body is reinforced by a backing or layer of fibrous material 6. As illustrated, this reinforce or backing 6 consists of a layer of woven textile fabric such as heavy canvas. It has been found that a satisfactory material for this purpose is a rubberized coarsely woven fabric which may become firmly bonded to the rubber body by vulcanization and sufficient rubber allowed to be forced through it during vulcanization to enable the stitch receiving stock applied upon its upper surface to become firmly united to the sole. The reinforcing layer or backing 6 may consist of a substantially narrow strip applied to the margin of the upper side of the sole and extending inwardly under the sewing rib. As herein illustrated the reinforcing layer of fabric 6 overlies substantially the entire upper surface of the sole blank but terminates a sufficient distance within the edge of the sole or on the feather 8 to prevent the fabric material from showing at the edge of the finished sole. Preferably, also, the backing extends over the heel seat portion of the sole so that this portion of the sole is reinforced either to be used for a nailed heel seat method of making shoes or a sewed heel seat method.

The stitch receiving element or sewing rib 10 for the sole consists of a fabric member 12 connected to the reinforcing layer 6 by vulcanization. Preferably, this member is formed of a plurality of layers of strong closely woven fabric and as illustrated the fabric forming the sewing rib 10 extends entirely across the sole from feather to feather. Alternatively, however, the layers 12 may consist of substantially narrow strips of fabric arranged to constitute a sewing rib. The marginal portion of the layers is folded upwardly to form the projecting sewing rib 10 and they are secured at their base to the upper side of the reinforcing or backing by vulcanization.

The reinforcing layer 6, the rib forming fabric 12 and the rubber body 2 are all strongly bonded together to provide a unitary sole construction by vulcanization and a convenient manner of accomplishing this is with a mold such as shown in Fig. 2 of the drawings. This mold comprises a bottom member 14 having a sole shaping recess the shape of the sole desired, the floor 16 of the mold through the shank portion preferably being concaved to impart a transverse curvature to the shank portion of the sole. In the use of the mold the rubber body 2 is first placed in the bottom member 14 of the mold and then the layer of fabric backing material 6 laid upon the upper surface of the rubber body and the layers of fabric 12 placed in position on the backing 6. The top member 16 of the mold is then placed in position, the portion 18 of this member forcing the central portion of the rib forming fabric 12 into intimate relation with the backing 6 and causing its marginal portion to be formed upwardly away from the upper surface of the reinforcing layer and form a projecting portion 10 which constitutes the sewing rib of the sole. Indentations 20 are preferably provided on the surface of the mold which shapes the feather 8 of the sole to impart indentations on the feather. These indentations or corrugations serve to render the termination of the reinforcing layer on the feather invisible in the finished shoe and insures a strong union between the rubber and the backing. The floor of the top member 16 of the mold is preferably convex corresponding to the concavity in the lower portion of the mold. With the several parts of the sole in their respective positions in the mold a substantial pressure is exerted upon the sole as an incident to the vulcanization of the sole in a suitable vulcanizing apparatus. The reinforcing layer 6 and the rib forming layer 12 are thereby firmly vulcanized to each other and to the rubber body 2 of the sole. It is within this invention permanently to attach, in any appropriate manner, a sewing rib of any suitable construction to a reinforcing layer instead of turning up the edge of a fabric layer to produce an integrally connected sewing rib as herein illustrated.

With a sole made as herein described, the angle of union between the feather 8 and the upstanding sewing rib 10 of the sole presents substantially firm and uniform surfaces for the penetration of the needle, thus facilitating the proper attachment of the shoe upper to the sole and the reinforcing layer further preventing the needle from passing under the sewing rib and penetrating the rubber body which offers less resistance to the needle whereby the objectionable puckering on the tread surface of the sole caused by the tensioning of the stitch is prevented. Moreover, when the needle penetrates the rubber body it seriously weakens the structure and causes the portions of the sole to break away particularly along the feather of the sole. By reason of the backing 6 extending beyond the side of the shoe or on to the feather 8 a much stronger and firmer feather is provided and the tendency of the inseam to open up and expose the inseam stitches is avoided.

Another important advantage in providing a composite sole structure in which the means for attaching the shoe upper to the sole consists substantially wholly of a fibrous material is that a much stronger and tighter inseam is possible than with a stitch receiving structure a large portion of which consists of rubber. Furthermore, the disadvantages heretofore experienced in sewing rubber, for example, the heating of the needle and the breaking of the thread are avoided. The sole may be used in the same manner and to the same advantage as a leather sole without any changes or additions to the regular shoe factory equipment for making leather sole turn shoes. When incorporating the sole in a shoe, the shoe upper 23 is attached to the upstanding or projecting sewing rib 10 on the upper side of the sole by the single faced stitches in the usual manner. The shoe is then turned and relasted, a shank piece 24 being secured in the shoe in the same manner as that of a leather shoe. If desired, a heel 26 may be secured to the heel end of the shoe, as shown in Fig. 4 of the drawings, or a wooden heel may be secured to the shoe in the usual manner.

The term rubber as herein used is not intended to be limited to a material the major part of which is rubber, but is used herein generically to include various rubber containing materials such as the so-called fiber soles now used extensively, as well as other similar materials.

Having described my invention, what I claim as new and desire to secure by Letters Patent of the United States is:—

1. As an article of manufacture, a sole for turn shoes consisting of a rubber compound body having a layer of fibrous material attached by vulcanization to the upper side of the rubber body with a free edge projecting above laterally adjacent surfaces of the sole and constituting a sewing rib for the sole.

2. As an article of manufacture, a sole for turn shoes consisting of a rubber compound body having a fabric member extending crosswise of the upper side of the rubber body and secured to the said rubber body by vulcanization with its outer edge folded upwardly at substantially right angles to the upper side of the sole and constituting a sewing rib for the sole.

3. As an article of manufacture, a sole for turn shoes consisting of a rubber compound body, a reinforce of fibrous material extending crosswise of the upper side of the rubber body and secured by vulcanization and a fabric member connected to the said fibrous material and having its outer edge projecting above laterally adjacent surfaces of the sole to form a stitch receiving rib on the upper side of the sole.

4. As an article of manufacture, a sole for turn shoes consisting of a rubber compound body, a reinforcing of fibrous material extending transversely of the upper side of the rubber body and secured to said rubber body by vulcanization and a sheet of fabric overlying the upper side of the fibrous layer and connected to the said fibrous layer and having its edge upturned from the fibrous material and projecting above laterally adjacent surfaces of the sole and constituting a sewing rib.

5. As an article of manufacture, a rubber sole for turn shoes consisting of a rubber compound body, a layer of fabric extending crosswise of the upper side of the rubber body and secured by vulcanization and a layer of fabric vulcanized to the said reinforcing layer and having its free marginal edge formed up to provide a stitch receiving rib on the upper side of the sole.

6. As an article of manufacture, a rubber sole for turn shoes comprising a rubber compound body with a fabric member vulcanized to the upper surface of the rubber body and extending crosswise of the sole and a fabric member vulcanized to the upper side of the fabric member and having its marginal portion raised with relation to laterally adjacent portions of the sole to form a stitch receiving rib.

7. As an article of manufacture, a rubber sole for turn shoes consisting of a rubber compound body, a layer of fibrous material attached by vulcanization to the upper side of the rubber body, and a fabric member secured to the said first-mentioned fabric member and having its margin projecting free of the sole to form a sewing rib.

8. As an article of manufacture, a rubber sole for turn shoes consisting of a rubber compound body, a layer of reinforcing fabric attached to the upper side of the rubber body by vulcanization and a rib forming fabric secured to the upper side of said reinforcing layer by vulcanization, a free marginal edge of said rib forming fabric being formed upwardly to constitute the sewing rib.

9. As an article of manufacture, a sole for turn shoes consisting of a rubber compound body, a substantially all-fibrous sewing rib formed upon the upper side of the rubber body and a fibrous layer underlying the sewing rib to protect the rubber body from being penetrated by the needle during the attachment of a shoe upper to the sole.

10. As an article of manufacture, a sole for turn shoes consisting of a rubber compound body, a substantially all-fibrous sewing rib formed upon the upper side of the rubber body and connected to the said rubber body by vulcanization and a layer of fibrous material underlying the sewing rib whereby the rubber body is protected from penetration by the needle of the sewing machine during the attachment of a shoe upper to the sole.

11. As an article of manufacture, a sole for turn shoes consisting of a rubber compound body, a layer of rubberized coarsely woven fabric extending transversely of the upper side of the rubber body and secured by vulcanization to the said rubber body and a substantially all-fibrous sewing rib connected to the upper side of the reinforcing layer by vulcanization.

12. As an article of manufacture, a sole for turn shoes consisting of a rubber compound body and a plurality of laminæ of fibrous material connected to the upper side of the rubber body with the marginal portion of one of the laminæ raised relatively to another and to laterally adjacent surfaces of the sole and constituting a stitch receiving rib for the sole.

13. As an article of manufacture, a sole for turn shoes consisting of a rubber compound body, laminæ of fibrous material extending along the margin of the upper side of the rubber body and connected to the said rubber body by vulcanization and a stitch receiving rib formed upon the laminæ by projecting one of the laminæ upwardly away from the rubber body to form a stitch receiving rib.

14. As an article of manufacture, a sole for turn shoes consisting of a rubber compound body and a plurality of laminæ secured to the said rubber body by vulcanization, one of the said laminæ terminating on the feather portion of the sole and another lamina having a free edge portion formed to present a shoulder to which to sew a shoe upper.

15. As an article of manufacture, a sole for turn shoes consisting of a rubber compound body and a plurality of laminæ of fibrous material vulcanized to the upper side of the rubber body and terminating within the outer edge of the rubber body, one of said laminæ having its margin extending upwardly from an adjacent lamina to present a rib projecting above laterally adjacent portions of the sole to which to sew a shoe upper and a feather for the sole.

16. As an article of manufacture, a sole for turn shoes consisting of a rubber compound body having a layer of fibrous material connected by vulcanization to its upper side and a stitch receiving element attached to the said fibrous layer, the outer edge of the said fibrous layer being covered with the rubber body to provide an all-rubber edge for the sole.

17. As an article of manufacture, a sole for turn shoes consisting of a rubber compound body, a layer of fibrous material connected to the upper side of the rubber body by vulcanization and terminating on the feather of the sole, and a stitch receiving structure attached to the said fibrous layer, the said feather of the sole having a plurality of indentations disposed transversely of the feather to obscure from sight the line of demarcation between the rubber body and the fibrous material where it lies on the feather of the sole.

In testimony whereof I have signed my name to this specification.

GEORGE FERGUSON.